United States Patent [19]

Kinoshita et al.

[11] Patent Number: 5,439,976

[45] Date of Patent: * Aug. 8, 1995

[54] POLYESTER COMPOSITION AND PROCESS FOR PRODUCING THE SAME

[75] Inventors: Satoshi Kinoshita; Hideo Takamatsu; Kazushige Ishiura, all of Ibaraki; Haruhisa Masuda; Shunro Taniguchi, both of Kurashiki, all of Japan

[73] Assignee: Kuraray Company Ltd., Kurashiki, Japan

[ * ] Notice: The portion of the term of this patent subsequent to Feb. 28, 2012 has been disclaimed.

[21] Appl. No.: 274,040

[22] Filed: Jul. 12, 1994

Related U.S. Application Data

[63] Continuation of Ser. No. 178,656, Jan. 7, 1994, Pat. No. 5,393,837.

[30] Foreign Application Priority Data

Jan. 21, 1993 [JP] Japan .................. 5-26270
Nov. 4, 1993 [JP] Japan ................. 5-275812
Nov. 4, 1993 [JP] Japan ................. 5-275813

[51] Int. Cl.$^6$ ............. C08L 67/02; C08L 53/00; C08L 53/02

[52] U.S. Cl. ..................... 525/92; 525/911; 525/914

[58] Field of Search .......................... 525/92

[56] References Cited

U.S. PATENT DOCUMENTS 3,723,574  3/1973  Brinkmann ................ 525/177
5,206,301  4/1993  Hattori ................... 525/314

FOREIGN PATENT DOCUMENTS 0320538  6/1989  European Pat. Off. .
0369164  5/1990  European Pat. Off. .
3705992  8/1987  Germany .
WO90/15104 12/1990 WIPO .

Primary Examiner—Patricia A. Short
Attorney, Agent, or Firm—Oblon, Spivak, McClelland, Maier & Neustadt

[57] ABSTRACT

A polyester composition principally comprising a polyester and a specific block copolymer having terminal hydroxyl groups. The polyester composition is excellent not only in heat resistance, solvent resistance and processability, but also in shock resistance.

11 Claims, No Drawings

POLYESTER COMPOSITION AND PROCESS FOR PRODUCING THE SAME

This is a continuation of application Ser. No. 08/178,656, filed on Jan. 7, 1994, now U.S. Pat. No. 5,393,837.

BACKGROUND OF THE INVENTION

1. Field of the Invention

The present invention relates to a polyester composition principally comprising a polyester and a block copolymer having terminal hydroxyl groups. The polyester composition is excellent not only in heat resistance, solvent resistance and processability, but also in impact resistance.

2. Description of the Related Art

In recent years, polyesters have been, utilizing their excellent heat resistance, solvent resistance, processability and like properties, widely used in the fields of electric parts, electronic parts, automobile parts, industrial machine parts and the like. However, polyesters have insufficient impact strength and relatively high specific gravity among general-purpose engineering plastics, and it has been desired to improve these drawbacks.

To improve the shock resistance of polyesters, incorporation of rubber components into polyesters has been attempted (see, for example Japanese Patent Publication Nos. 5224/1971, 5225/1971, 5227/1971 and 32886/1971). To decrease the specific gravity of polyesters, attempts have been made to blend polymers having low specific gravity such as polyethylene and polypropylene (see, for example, Japanese Patent Application Laid-open No. 147/1978).

With compositions obtained by blending different polymers, there are, in general, very few combinations of compatible components. Thus, when compositions are obtained by blending polyesters with a rubber component, or polyethylene, polypropylene or like polymers, there occur in most cases the problems of non-uniformity, inter-phase delamination and the like due to poor compatibility so that the object of improving the shock resistance or decreasing the specific gravity of polyesters has not been achieved.

There has been reported that a composition comprising a polyester and a block copolymer having a structure of P—Q—P (P: polymer block comprising an aromatic vinyl compound, Q: polymer block comprising a conjugated diene) in which at least 70% of the conjugated diene part is hydrogenated (see, for example, BP 1,581,167 and Japanese Patent Application Laid-open No. 150464/1977). This composition is, however, unsatisfactory in shock resistance and not completely sufficient in tensile elongation.

SUMMARY OF THE INVENTION

Accordingly, an object of the present invention is to provide a polyester having improved elasticity and shock resistance, as well as decreased specific gravity.

Other objects, features and advantages of the invention will become apparent from the following description.

As a result of an intensive study to solve the above problems, the present inventors have come to the invention.

The present invention provides a polyester composition comprising the following two components (a) and (b): (a) a polyester and (b) a modified first block copolymer (b−1) comprising a first block copolymer and having terminal hydroxyl groups, said first block copolymer comprising:

at least one block A selected from the group consisting of a polymer block consisting essentially of an aromatic vinyl compound and a hydrogenated polybutadiene block obtained by hydrogenating a polybutadiene block having not more than 20% of 1,2-bond and at least one block B selected from the group consisting of a hydrogenated polyisoprene block, a hydrogenated polybutadiene block obtained by hydrogenating a polybutadiene block having 30 to 70% of 1,2-bond and a hydrogenated isoprene-butadiene random copolymer block; and/or a modified second block copolymer (b−2) having terminal hydroxyl groups, said second block copolymer comprising:

at least one polymer block C principally comprising an aromatic vinyl compound and at least one polyisobutylene block D; the ratio by weight between said component (a) and said component (b) being (a)/(b)=98/2 to 40/60.

The above polyester composition of the present invention can be obtained by blending under melting condition a polyester (a) and a modified first block copolymer (b−1) and/or a modified second block copolymer (b−2) in a ratio by weight of the polyester/the modified block copolymer of 98/2 to 40/60or by adding, upon production of a polyester (a) by transesterification or esterification followed by polycondensation, a modified first block copolymer (b−1) and/or a modified second block copolymer (b−2) to the reaction zone at a time before completion of the polycondensation of the polyester.

DETAILED DESCRIPTION OF THE INVENTION

Polyesters used as (a) component for the polymer composition of the present invention are polymers obtained by polycondensing an aromatic dicarboxylic acid, a polydroxyaromatic dicarboxylic acid or an aliphatic dicarboxylic acid with an aromatic diol or an aliphatic diol, or polymers obtained by ring-opening polymerization of lactones. Representative examples of these polymers are polyethylene terephthalate (hereinafter referred to as "PET-polymer"), polybutylene terephthalate (hereinafter referred to as "PBT-polymer"), polyallylates, poly-p-hydroxyaromatic acid-based polyesters, polyethylene naphthalate (hereinafter referred to as. "PEN-polymer"), poly-1,4-cyclohexanedimethylene terephthalate and polycaprolactones.

PET-polymer

The acid component used for producing PET-polymer may be terephthalic acid or ester-forming derivatives thereof alone, but may as necessary contain a small amount (generally not more than 20 mole%) of other acid component. Examples of such co-usable acid components are aromatic dicarboxylic acids, such as isophthalic acid, phthalic acid, 2,6-naphthalenedicarboxylic acid, 1,5-naphthalenedicarboxylic acid, bis(p-carboxyphenyl)methane, anthrathenedicarboxylic acid, 4,4'-diphenyl ether dicarboxylic acid and sodium 5-sulfoisophthalate; aliphatic dicarboxylic acid, such as adipic acid, sebacic acid, azelaic acid and dodecanedioic acid; alicyclic dicarboxylic acid, such as 1,3-cyclohexanedicarboxylic acid and 1,4-cyclohexanedicarboxylic acid; and ester-forming derivatives (e.g. lower alkyl esters such as methyl ester and ethyl ester) of the foregoing. These cousable acids may be used singly or in combination.

The diol component used for producing PET-polymer may be ethylene glycol alone, but may as necessary contain a small amount (generally not more than 20 mole %) of other diol component. Examples of such co-usable diols are aliphatic diols having 3 to 10 carbon atoms, such as propylene glycol, 1,4-butanediol, neopentyl glycol, 1,5-pentanediol, cyclohexanedimethanol and cyclohexanediol; diethylene glycol; and polyalkylene glycols having a molecular weight of not more than 6,000, such as polyethylene glycol, poly-1,3-propylene glycol and polytetramethylene glycol. These cousable diol components may be used singly or in combination.

The PET-polymer may further contain a copolymerization component having at least 3 functional groups, such as glycerine, trimethylolpropane, pentaerythritol, trimellitic acid or pyromelitic acid, in such a small amount as not to impair its characteristics to a large extent.

The PET-polymer used in the present invention can be produced by the known processes with no specific limitation. The PET-polymer may have any molecular weight or intrinsic viscosity within the usual range.

PBT-polymer

The acid component used for producing PBT-polymer may be terephthalic acid or ester-forming derivatives thereof alone, but may as necessary contain a small amount (generally not more than 20 mole %) of other acid component. Examples of such co-usable acid components are aromatic dicarboxylic acids, such as isophthalic acid, phthalic acid, 2,6-naphthalenedicarboxylic acid, 1,5-naphthalenedicarboxylic acid, bis(p-carboxyphenyl)methane, anthrathenedicarboxylic acid, 4,4'-diphenyl ether dicarboxylic acid and sodium 5-sulfoisophthalate; aliphatic dicarboxylic acid, such as adipic acid, sebacic acid, azelaic acid and dodecanedioic acid; alicyclic dicarboxylic acid, such as 1,3-cyclohexanedicarboxylic acid and 1,4-cyclohexanedicarboxylic acid; and ester-forming derivatives. (e.g. lower alkyl esters such as methyl ester and ethyl ester) of the foregoing. These cousable acids may be used singly or in combination.

The diol component used for producing PBT-polymer may be 1,4-butanediol alone, but as necessary may contain a small amount (generally not more than 20 mole %) of other diol component. Examples of such co-usable diols are aliphatic diols having 2 to 10 carbon atoms, such as ethylene glycol, propylene glycol, neopentyl glycol, 2-methyl-1,3-propanediol, 1,5-pentanediol, cyclohexanedimethanol and cyclohexanediol; diethylene glycol and polyalkylene glycols having a molecular weight of not more than 6,000, such as polyethylene glycol, polytrimethylene glycol and polytetramethylene glycol. These co-usable diol components may be used singly or in combination.

The PBT-polymer may contain a copolymerization component having at least 3 functional groups, such as glycerine, trimethylolpropane, pentaerythritol, trimellitic acid or pyromelitic acid, in such a small amount as not to impair its characteristics to a large extent.

The PBT-polymer used in the present invention can be produced by the known processes with no specific limitation. The PBT-polymer may have any molecular weight or intrinsic viscosity within the usual range.

PEN-polymer

The acid component used for producing PEN-polymer may be 2,6-naphthalenedicarboxylic acid, 1,5-naphthalenedicarboxylic acid or ester-forming derivatives thereof alone, but may as necessary contain a small amount (generally not more than 20 mole %) of other acid component. Examples of such cousable acid components are aromatic dicarboxylic acids, such as terephthalic acid, isophthalic acid, phthalic acid, bis(p-carboxyphenyl)methane, anthrathenedicarboxylic acid, 4,4'-diphenyldicarboxylic acid 4,4'-diphenyl ether dicarboxylic acid and 1,2-diphenoxyethane-4',4''-dicarboxylic acid; aliphatic dicarboxylic acid, such as succinic acid, adipic acid and sebacic acid; and ester-forming derivatives (e.g. lower alkyl esters such as methyl ester and ethyl ester) the foregoing. These co-usable acids may be used alone or in combination.

The diol component used for producing PEN-polymer may be ethylene glycol alone, but as necessary may contain a small amount (generally not more than 20 mole %) of other diol component. Examples of such co-usable diols are aliphatic diols having 3 to 10 carbon atoms, such as propylene glycol, neopentyl glycol, 1,4-butanediol, 1,5-pentanediol, 1,6-hexanediol, decamethylenediol and cyclohexanedol; diethylene glycol and polyalkylene glycols having a molecular weight of not more than 6,000, such as diethylene glycol, poly-1,3-propylene glycol and polytetramethylene glycol. These co-usable diol components may be used singly or in combination.

The PEN-polymer may contain a copolymerization component having at least 3 functional groups, such as glycerine, trimethylolpropane, pentaerythritol, trimellitic acid or pyromellitic acid, in such a small amount as not to impair its characteristics to a large extent.

The PEN-polymer used in the present invention can be produced by the known processes with no specific limitation. The PEN-polymer may have any molecular weight or intrinsic viscosity within the usual range.

The modified block copolymers (b−1) and (b−2) that constitute another component in the present invention are produced by anionic polymerization and cationic polymerization, respectively.

Examples of the modified block copolymer (b−1) are those represented by the following formulas.

(W—X)k—OH
(X—W)l—OH
W—(X—W)m—OH
X—(W—X)n—OH wherein W represents polymer block A, X polymer block B, k, l, m and n each an integer of at least 1 and OH a hydroxyl group.

The number of repetition of polymer block A and polymer block B in the modified block copolymer (b−1), i.e. k, l, m and n can each be any integer of at least 1, but they are preferably not more than 5. The modified block copolymer (b−1) used may be a single item or admixtures of 2 or more.

The aromatic vinyl compound constituting polymer block A is at least one member selected from styrene, α-methylstyrene, 3-methylstyrene, 4-propylstyrene, 1-vinylnaphthalene, 2-vinylnaphthalene and the like, among which styrene is particularly preferred.

The modified block copolymer (b−1) is obtained by the successive steps of producing a living polymer by anionic living polymerization using the usual organo alkalimetal catalyst, adding hydroxyl groups to the ends of the obtained living polymer, and conduct hydrogenation. For example, among block copolymers represented by the formula (W—X')k or formula W—(X'—W)m (wherein W, k and m are as defined above and X' represents a hydrogenated polyisoprene block), precursors before hydrogenation of binary block copolymers are obtained by a process which comprises effecting anionic polymerization of an aromatic vinyl monomer or butadiene monomer at a temperature of 30 to 60° C. using a polymerization initiator of lithium n-butyl, lithium s-butyl or the like and in a polymerization solvent of a saturated aliphatic hydrocarbon such as hexane, heptane or cyclohexane, to obtain a living polymer and then conducting anionic polymerization of isoprene monomer. In the production of the above binary block copolymers, successive anionic polymerization of an aromatic vinyl monomer or butadiene monomer can yield ternary block copolymers. Further repetition of this polymerization procedure can produce block copolymers of 4-nary or more block copolymers.

Among block copolymers represented by the formula (X'—W)l or formula X'—(W—X')n (wherein W, l and n are as defined above and X' represents a polyisoprene block), precursors before hydrogenation of binary block copolymers are obtained by a process which comprises effecting anionic polymerization of isoprene monomer to obtain a living polymer and then conducting anionic polymerization of an aromatic vinyl monomer or butadiene monomer. In the production of these binary block copolymers, successive anionic polymerization of isoprene monomer can yield ternary block copolymers. Further repetition of this polymerization procedure can produce block copolymers of 4-nary or more block copolymers.

In the above production of the block copolymers, subjecting a mixture of butadiene monomer and isoprene monomer to anionic polymerization can introduce a random copolymer block of isoprene and butadiene. Besides, anionic polymerization of butadiene monomer in the presence of appropriate amount of dioxane or tetrahydrofuran can introduce a polybutadiene block having 30 to 70% of 1,2-bond. Likewise, anionic polymerization of isoprene monomer in the presence of an appropriate amount of dioxane or tetrahydrofuran can introduce a polyisoprene block having 30 to 70% of 3,4-bond.

When the block copolymer has achieved the desired molecular structure and molecular weight, the polymerization is terminated by addition of ethylene oxide or propylene oxide, followed by addition of an active hydrogen compound such as an alcohol, a carboxylic acid or water.

The block copolymer thus obtained is then hydrogenated. Either a homogeneous catalyst or heterogeneous catalyst can be used for the hydrogenation. To use a homogeneous catalyst, a Ziegler catalyst consisting of a combination of an organo transition metal catalyst (for example, nickel acetyl acetonate, cobalt acetyl acetonate, nickel naphthenate acid and cobalt naphthenate) and an alkylation product of aluminum, alkali metal or alkali earth metal is used in a molar ratio of about 0.01 to 0.1% based on carbon-carbon double bonds contained in the block copolymer to be hydrogenated. Hydrogenation is generally effected at a temperature of room temperature to 150° C. under a hydrogen pressure of atmospheric pressure to 50 kg/cm² and completes in about 1 to 50 hours. After completion of reaction, acidic water is added to the reaction vessel and the contents are stirred vigorously, to dissolve the hydrogenation catalyst in the water. Water phase is removed from the resulting phase-separated liquid and then the solvent is distilled off, to obtain the desired modified block copolymer (b−1).

It is desirable that in the modified block copolymer (b−1) used in the present invention at least 50% of carbon-carbon double bonds based on isoprene monomer or butadiene monomer be hydrogenated, and it is more desirable that at least 80% of the double bonds be hydrogenated from the viewpoints of resistance to thermal degradation, weather resistance and the like.

Examples of the modified block copolymer (b−2) are those represented by the following formulas.

HO—(Z—Y—Z)q—OH
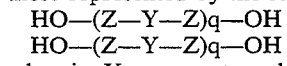

wherein Y represents polymer block C; Z polymer block D; p and q each an integer of at least 1 and OH a hydroxyl group.

The aromatic vinyl compound constituting polymer block A is at least one member selected from styrene, α-methylstyrene, p-methylstyrene, p-t-butylstyrene, p-chlorostyrene and the like, among which styrene is particularly preferred.

The modified block copolymer (b−2) is obtained by producing a living polymer by the usual cationic living polymerization using 1,4-di(2-methoxy-2-propyl)benzene and adding hydroxyl groups to the ends of the obtained living polymer. For example, a styrene-isobutylene-styrene triblock copolymer having terminal hydroxyl groups is obtained by a process which comprises the successive steps of effecting cationic polymerization of isobutylene monomer at a temperature of −10 to −90° C. in a polymerization solvent of a cycloalkane such as cyclohexane or methylcyclohexane or a halogenized alkane such as methyl chloride or methylene chloride and using an initiator of 1,4-di(2-methoxy-2-propyl)benzene and titanium tetrachloride, to obtain a living polymer, adding N,N-dimethylacetamide and 2,6-di-t-butylpyridine to the living polymer, effecting cationic polymerization of styrene monomer to obtain a styreneisobutylene-styrene tri-block copolymer having terminal chlorine atoms and subjecting the obtained block copolymer to dehydrochlorination, hydroboration and oxidation, to obtain a styrene-isobutylene-styrene tri-block copolymer having terminal hydroxyl groups. Repetition of this polymerization procedure can produce 5-nary or more block copolymers having an odd number of blocks.

The hydroxyl groups in the modified block copolymer (b−1) and those in the modified block copolymer (b−2) may be added to the end of either of the corresponding polymer block A or polymer block B and to the end of either of the corresponding polymer block C or polymer block D, respectively, but it is desirable that they be added to the end of polymer block A and polymer block C, which are hard blocks, respectively. Most desirably they are added to the end of styrene block. The amount of the terminal hydrogen group added is preferably at least 0.5 unit per modified block copolymer molecule, in particular at least 0.7 unit per molecule.

It is desirable that polymer block A in the modified block copolymer (b−1) and polymer block C in the modified block copolymer (b−2) both have a number average molecular weight of 4,000 to 50,000. It is desirable that polymer block B in the modified block copolymer (b−1) and polymer block D in the modified block copolymer (b—2) both have a number average molecular weight of 10,000 to 100,000. Further, it is desirable that modified block copolymers (b—1) and (b—2) both have a number average molecular weight of 14,000 to 150,000.

The ratio by weight of polymer block A and block B in the modified block copolymer (b—1) and that of polymer block C and block D in the modified block copolymer (b—2) are not particularly limited, but both ratios are preferably in a range of 1:9 to 7:3.

In the polyester composition of the present invention, a polyester (a) and a modified block copolymer (b) are used in a ratio by weight of the polyester/the modified block copolymer of 98/2 to 40/60. If the ratio by weight of polyester/modified block copolymer is less than 40, the effects of excellent heat resistance, solvent resistance and mechanical properties inherent to polyester are not produced. On the other hand, if the ratio by weight of polyester/modified block copolymer exceeds 98, the effect of improving the shock resistance and decreasing the specific gravity of the polyester used cannot be produced.

The polymer composition of the present invention may, as required, incorporate other polymers, e.g. polyolefins such as polyethylene and polypropylene and polystyrene, and additives, e.g. reinforcing agent, filler, antioxidant, releasing agent, color, ultraviolet absorber, antistatic agent, crystal nucleus agent and fire retardant.

The polymer composition of the present invention can be produced by blending the above two polymers and, as required other additives, in the usual manner, at the same time or successively under melting conditions. For this melting and blending operation, there can be used any type of a kneader such as single-screw extruder, twin-screw extruder, conventional kneader or banbary mixer and there are no specific restrictions with respect to the type of the apparatus used. There is no particular limitation to the melting conditions and melt kneading is generally attainable at a temperature of 180 to 270° C. in about 3 to 15 minutes.

The polymer composition of the present invention can also be obtained by, while a polyester (a) is being produced by transesterification or esterification followed by polycondensation, adding a modified block copolymer (b) at a time before completion of the polycondensation of the polyester. In the polyester composition obtained by this process, particles having an average particle diameter of not more than 1 μm and principally comprising the modified block copolymer (b) are present, while being dispersed, in a matrix resin principally comprising the polyester (a). This structure can improve the shock resistance of the polyester to a large extent, without impairing excellent characteristics inherent to polyesters, such as elongation. The polyester composition contains, as small component, copolymers of the modified block copolymer and the polyester. From the viewpoint of achieving further improvement of the shock resistance of the polyester, it is preferable that the particles principally comprising the modified block copolymer have an average particle diameter of 0.01 to 0.7 μm. In producing the polyester composition, any optional one of the usual processes for synthesis of conventional polyesters except for addition of modified block copolymer. A representative one of such processes comprises, for a dicarboxylic acid component of a dicarboxylic acid such as terephthalic acid, conducting esterification with glycol or, for a dicarboxylic acid ester such as dimethyl terephthalate, conducting transesterification with glycol, and then subjecting the obtained product of esterification or transesterification to polycondensation under the condition of high temperature and reduced pressure.

The polyester composition of the present invention can also be one obtained by a process which comprises conducting polycondensation in the presence of a modified block copolymer (b), to produce a polyester and then blending under melting condition the polyester with another polyester. In this type polyester composition, it is desirable that all polyesters and the modified block copolymer be contained in a ratio by weight of [the polyesters (a)]/[the modified block copolymer (b)] of 98/2 to 65/35. With too high a content of the modified block copolymer, excellent heat resistance and moldability inherent to polyester sometimes do not exhibit, while with too low a content of modified block copolymer the shock resistance of the resulting polyester composition is insufficient.

The polyester obtained by conducting polycondensation of in the presence of a modified block copolymer (b) can be blended under melting condition with another polyester by any optional process with no specific restrictions. For example, necessary components including the two items can be, at the same time or successively, melt kneaded by using a kneader such as single-screw extruder, twin-screw extruder, conventional kneaded or banbary mixer. It is also possible to add a previously produced another polyester to, upon completion of the polycondensation in the presence of a modified block copolymer (b), to the polymerization vessel to conduct melt kneading.

The polyester composition thus obtained generally has a structure comprising a matrix resin consisting essentially of at least 2 polyesters and, dispersed therein, particles principally comprising the modified block copolymer (b) and having an average particle diameter of not more than 1 μm. The polyester composition is excellent both in shock resistance and melt flowability (moldability). From the viewpoint of further improving the shock resistance of polyester, it is preferable that the particles principally comprising the modified block copolymer have an average particle diameter in a range of 0.01 to 0.7 μm. This type polyester composition contains a small amount of copolymers of the modified block copolymer and polyester.

The polyester composition of the present invention can be molded by any optional process such as injection molding, extrusion molding, pressing, blow molding, extrusion-blow molding, calendering or casting and yield various shaped articles having optional shapes and end-uses, such as electrical parts, electronics parts, machine parts, automobile parts, pipes, sheets, films and daily goods.

Other features of the invention will become apparent in the course of the following descriptions of exemplary embodiments which are given for illustration of the invention and are not intended to be limiting thereof.

EXAMPLES

The types of polymers used in the Examples are, together with their abbreviations, shown in Table 1 below.

TABLE 1

(a) Polyesters

| Abbr. | Polymer |
|---|---|
| PBT | Polybutylene terephthalate |
| PET | Polyethylene terephthalate |
| PEN | Polyethylene naphthalate |

(b) Block copolymers

| Abbr. | Copolymer | Number average molecular weight of each block | St. content[1] wt % | Hydrogenation, Deg. of unsaturation | OH—group cont. (pcs/molecule) |
|---|---|---|---|---|---|
| SEP | PSt/PIp[2] | 12000/28000 | 30 | yes (5%) | 0 |
| SEP-OH(1) | PSt/PIp[2] | 12000/28000 | 30 | yes (5%) | 0.8 |
| SEP-OH(2) | PSt/PIp[2] | 10000/20000 | 33 | yes (5%) | 0.7 |
| EPS-OH(1) | PIp/PSt[3] | 28000/12000 | 30 | yes (5%) | 0.8 |
| EPS-OH(2) | PIp/PSt[3] | 20000/10000 | 33 | yes (5%) | 0.8 |
| SEPS | PSt/PIp/PSt[4] | 6000/28000/6000 | 30 | yes (5%) | 0 |
| SEPS-OH | PSt/PIp/PSt[4] | 6000/28000/6000 | 30 | yes (5%) | 0.8 |
| HVSIS | PSt/PVIp/PSt[5] | 9000/42000/9000 | 30 | yes (10%) | 0 |
| HVSIS-OH | PSt/PVIp/PSt[5] | 9000/42000/9000 | 30 | yes (10%) | 0.7 |
| SEBS-OH | PSt/PBd/PSt[6] | 6000/28000/6000 | 30 | yes (5%) | 0.8 |
| HBIB | PBd/PIp/PBd[7] | 6000/28000/6000 | 30[9] | yes (3%) | 0 |
| HBIB-OH | PSt/pVIp/PSt[7] | 6000/28000/6000 | 30[9] | yes (3%) | 0.75 |
| SiBS | PSt/PiB/PSt[8] | 6000/28000/6000 | 30 | no (0%) | 0 |
| HO-SiBS-OH | PSt/PiB/PSt[8] | 6000/28000/6000 | 30 | no (0%) | 1.3 |

[1] Styrene content
[2] Polystyrene/polyisoprene(3,4-bond: 8%) di-block copolymer
[3] Polyisoprene (3,4-bond: 8%)/polystyrene di-block copolymer
[4] Polystyrene/polyisoprene(3,4-bond: 8%)/polystyrene tri-block copolymer
[5] Polystyrene/polyisoprene(3,4-bond: 45%)/polystyrene tri-block copolymer
[6] Polystyrene/polybutadiene(1,2-bond: 45%)/polystyrene tri-block copolymer
[7] Polybutadiene(1,2-bond: 8%)/polyisoprene(3,4-bond: 8%)/ polybutadiene(1,2-bond: 8%) tri-block copolymer
[8] Polystyrene/polyisobutylene/polystyrene tri-block copolymer
[9] Butadiene unit content

EXAMPLES 1 THROUGH 15 and COMPARATIVE EXAMPLES 1 THROUGH 17

The polymers shown in Table 1 were each blended through a Bravender in a weight ratio as shown in Tables 2 and 3 and at a temperature of 240 to 250° C., slit and then pressed at a temperature of 240 to 250° C. under a pressure of 100 kg/cm², to prepare various polymer compositions.

The test specimens were tested for specific gravity to judge their light weight. They were also tested for tensile elongation in accordance with JIS K7113 and notched Izod impact strength in accordance with JIS K7110, for evaluation of elasticity and shock resistance respectively. The results are shown in Tables 2 and 3.

TABLE 2

| | Polymer composition | | | | Properties of molded article | | |
|---|---|---|---|---|---|---|---|
| | (a) | | (b) | | Specific gravity | Elongation (%) | Notched Izod (kg · cm/cm) |
| Example | Type | Content (wt %) | Type | Content (wt %) | | | |
| 1 | PBT | 95 | SEP-OH(1) | 5 | 1.27 | 220 | 5 |
| 2 | PBT | 70 | SEP-OH(1) | 30 | 1.17 | 230 | 6 |
| 3 | PBT | 95 | EPS-OH(1) | 5 | 1.27 | 210 | 10 |
| 4 | PBT | 50 | EPS-OH(1) | 50 | 1.08 | 240 | 15 |
| 5 | PBT | 95 | SEPS-OH | 5 | 1.27 | 210 | 12 |
| 6 | PBT | 50 | SEPS-OH | 50 | 1.08 | 240 | 20 |
| 7 | PBT | 70 | SEPS-OH | 15 | 1.17 | 240 | 20 |
| | | | HO-SiBS-OH | 15 | | | |
| 8 | PET | 70 | SEPS-OH | 30 | 1.25 | 6 | 18 |
| 9 | PET | 70 | HVSIS-OH | 30 | 1.25 | 5 | 15 |
| 10 | PET | 70 | HBIB-OH | 30 | 1.25 | 5 | 15 |
| 11 | PET | 70 | HO-SIBS-OH | 30 | 1.25 | 5 | 20 |
| 12 | PEN | 70 | SEPS-OH | 30 | 1.31 | 10 | 10 |
| 13 | PEN | 70 | HVSIS-OH | 30 | 1.31 | 10 | 10 |
| 14 | PEN | 70 | HBIB-OH | 30 | 1.30 | 10 | 10 |
| 15 | PEN | 70 | HO-SIBS-OH | 30 | 1.30 | 12 | 13 |

TABLE 3

| Comparative Example | Polymer composition (a) Type | (a) Content (wt %) | Polymer composition (b) Type | (b) Content (wt %) | Properties of molded article Specific gravity | Elongation (%) | Notched Izod (kg · cm/cm) |
|---|---|---|---|---|---|---|---|
| 1 | PBT | 100 | — | 0 | 1.31 | 200 | 3 |
| 2 | PBT | 95 | SEP | 5 | 1.27 | 210 | 1.5 |
| 3 | PBT | 70 | SEP | 30 | 1.18 | 200 | 1.5 |
| 4 | PBT | 95 | SEPS | 5 | 1.27 | 210 | 1.5 |
| 5 | PBT | 70 | SEPS | 30 | 1.18 | 210 | 1.5 |
| 6 | PBT | 99 | SEPS-OH | 1 | 1.31 | 200 | 3 |
| 7 | PBT | 30 | SEPS-OH | 70 | 1.05 | 50 | 15 |
| 8 | PET | 100 | — | 0 | 1.49 | 3 | 12 |
| 9 | PET | 70 | SEPS | 30 | 1.25 | 5 | 4 |
| 10 | PET | 70 | HVSIS | 30 | 1.25 | 5 | 4 |
| 11 | PET | 70 | HBIB | 30 | 1.25 | 5 | 3 |
| 12 | PET | 70 | SiBS | 30 | 1.25 | 5 | 4 |
| 13 | PEN | 100 | — | 0 | 1.51 | 5 | 7 |
| 14 | PEN | 70 | SEPS | 30 | 1.31 | 10 | 4 |
| 15 | PEN | 70 | HVSIS | 30 | 1.31 | 9 | 4 |
| 16 | PEN | 70 | HBIB | 30 | 1.31 | 10 | 4 |
| 17 | PEN | 70 | SiBS | 30 | 1.31 | 9 | 4 |

It is apparent from the results shown in Tables 2 and 3, that the compositions of the present invention give molded articles having smaller specific gravity, larger elongation and higher impact strength than those of compositions containing polyesters alone.

EXAMPLE 16

A reaction vessel was charged with 74.8 parts by weight of dimethyl terephthalate, 41.7 parts by weight of 1,4-butanediol and 0.03 part by weight of tetraisopropyl titanate (theoretical yield of PBT: 85 parts by weight). Transesterification was effected under atmospheric pressure by heating to elevate the temperature gradually from 170° C. to 230° C. and terminated when 23.8 parts by weight of methanol had been distilled off. Thereafter, 15 parts by weight of EPS—OH(2) was added and the pressure inside the vessel was reduced to shift the system to polycondensation as follows. The reaction temperature was elevated from 230° C. to 250° C. over about 30 minutes, while the pressure was reduced from atmospheric pressure to 0.2 mmHg. Under this reaction temperature and pressure, polycondensation was effected for 60 minutes. Then the polycondensation was terminated by introducing nitrogen into the vessel to restore the pressure to atmospheric pressure, to obtain a PBT-polymer composition.

EXAMPLE 17

A reaction vessel was charged with 74.8 parts by weight of dimethyl terephthalate, 41.7 parts by weight of 1,4 -butanediol and 0.03 part by weight of tetraisopropyl titanate (theoretical yield of PBT: 85 parts by weight), and then 15 parts by weight of EPS—OH(2) was added. Transesterification was effected under atmospheric pressure by heating to elevate the temperature gradually from 170° C. to 230° C. and terminated when 23.8 parts by weight of methanol had been distilled off. Then the pressure inside the vessel was reduced to shift the system to polycondensation as follows. The reaction temperature was elevated from 230° C. to 250° C. over about 60° C., while the pressure was reduced from atmospheric pressure to 0.2 mmHg. Under this reaction temperature and pressure, polycondensation was effected for about 60 minutes. Then the polycondensation was terminated by introducing nitrogen into the vessel to restore the pressure to atmospheric pressure, to obtain a PBT-polymer composition.

EXAMPLE 18

Example 16 was repeated except that the amount of EPS—OH(2) added was so changed as to make the ratio by weight of [theoretical yield Of PBT]/[amount of EPS—OH(2) added] 70/30, to conduct transesterification and polycondensation to obtain a PBT-polymer composition.

EXAMPLE 19

Transesterification was conducted in the same manner as in Example 16. Then 15 parts by weight of SEP—OH(2) was added, and polycondensation was effected in the same manner as in Example 6, to obtain a PBT-polymer composition.

EXAMPLES 20 THROUGH 22

Example 16 was repeated except that, instead of EPS—OH, SEPS—OH was added in such an amount as to make the ratio by weight of [theoretical yield of PBT]/[amount of SEPS—OH added] of 95/5 (Example 20), 90/10 (Example 21) or 85/15 (Example 22), to obtain corresponding PBT-polymer compositions.

EXAMPLES 23 and 24

Example 16 was repeated except that, instead of EPS—OH, SEBS—OH was added in such an amount as to make the ratio by weight of [theoretical yield of PBT]/[amount of SEBS—OH added] of 90/10 (Example 23) or 85/15 (Example 24), to obtain corresponding PBT-polymer compositions.

EXAMPLE 25

A reaction vessel was charged with 73.5 parts by weight of terephthalic acid and 27.5 parts by weight of ethylene glycol (theoretical yield of PBT: 85 parts by weight) and transesterification was effected at 250° C. and under a pressure of 2.5 kg/cm$^2$ for 2 hours. Thereafter, 0.03 part by weight of antimony trioxide and 0.01 part by weight of phosphorous acid, and then 15 parts by weight of SEPS—OH. The pressure inside the vessel was reduced to shift the system to polycondensation as follows. The reaction temperature was elevated from 250° C. to 280° C. over about 45 minutes, while the pressure was reduced from atmospheric pressure to 0.2 mmHg. Under this reaction temperature and pressure, poly,condensation was effected for about 90 ducing nitrogen into the vessel to restore the pressure to atmospheric pressure, to obtain a PET-polymer composition.

EXAMPLE 26

Example 25 was repeated except that the ratio by weight of [theoretical yield of PET]/[amount of SEBS—OH added] was changed to 85/15, to obtain a PET-polymer composition.

COMPARATIVE EXAMPLE 18

Example 16 was repeated except that no modified block copolymer was added at all, to obtain a PBT.

COMPARATIVE EXAMPLE 19

Example 25 was repeated except that no modified block copolymer was added at all, to obtain a PET.

The polyester compositions obtained in the above Examples 16 through 26 and the polyesters (single component) obtained in Comparative Examples 18 and 19 were tested for specific density, tensile elongation and Izod impact strength in the same manner as for the samples obtained in Examples 1 through 15 and Comparative Examples 1 through 17, except that injection molded specimens were used for the tests instead of pressed specimens. In addition, with each specimen the average particle diameter of dispersed particles principally comprising a modified block copolymer was measured according to the following method.

Measurement of Average Diameter of Dispersed Particles

Part of a test specimen was broken. The modified block copolymer dispersed therein was extracted off with toluene copolymer dispersed therein was .extracted off with toluene and then the broken surface was observed in a scanning electron microscope. The broken surface was image processed, to obtain an average diameter of dispersed particles.

REFERENCE EXAMPLE 1

PBT-polymer composition (a)①

A reaction vessel was charged with 76.6 parts by weight of dimethyl terephthalate, 4.2.6 parts by weight of 1,4-butanediol and 0.03 part by weight of tetraisopropyl titanate (theoretical yield of PBT: 87 parts by weight). Transesterification was effected under atmospheric pressure by heating to elevate the temperature gradually from 170° C. to 230° C. and terminated when 24.4 parts by weight of methanol had been distilled off. Thereafter, 13 parts by weight of EPS—OH(2) was added and the pressure inside the vessel was reduced to shift the system to polycondensation as follows. The reaction temperature was elevated from 230° C. to 250° C. over about 30 minutes, while the pressure was reduced from atmospheric pressure to 0.2 mmHg. Under this reaction temperature and pressure, polycondensation was effected for about 60 minutes. Then the polycondensation was terminated by introducing nitrogen into the vessel to restore the pressure to atmospheric pressure, to obtain a PBT-polymer composition (a)①. The intrinsic viscosity of PBT in the composition thus obtained was determined at a temperature of 30° C. with a 1/1 by weight mixed solvent of phenol/tetrachloroethane, to give 1.01 dl/g.

PBT-polymer composition (a)②

The above same procedure was followed except that SEBS—OH was used instead of EPS—OH(2) and that the ratio by weight of [theoretical yield of PBT]/[amount of SEBS—OH added] was set at 87/13, to conduct transesterification and polycondensation. The PBT-polymer composition (a)② obtained had an intrinsic viscosity of 1.01 dl/g.

PBT-polymer composition (a)③

The above procedure for preparing the PBT-polymer composition (a)① was followed except that SEPS—OH was used instead of EPS—OH(2) and that the ratio by weight of [theoretical yield of PBT]/[amount of SEPS—OH added] was set at 87/13, to conduct

TABLE 4

| Example or Comparative Example | Polymer composition | | | | Timing of addition of (b) | Properties of molded article | | | |
|---|---|---|---|---|---|---|---|---|---|
| | (a) | | (b) | | | Notched Izod (kg·cm/cm) | Tensile elongation (%) | Ave. particle dia. (μm) | Specific gravity |
| | Type | Content (wt %) | Type | Content (wt %) | | | | | |
| Ex. | | | | | | | | | |
| 16 | PBT | 85 | EPS-OH(2) | 15 | [1] | 18 | 152 | 0.3 | 1.23 |
| 17 | PBT | 85 | EPS-OH(2) | 15 | [2] | 18 | 149 | 0.3 | 1.23 |
| 18 | PBT | 70 | EPS-OH(2) | 30 | [1] | 71 | 231 | 0.5 | 1.17 |
| 19 | PBT | 85 | SEP-OH(2) | 15 | [1] | 12 | 92 | 0.5 | 1.23 |
| 20 | PBT | 95 | SEPS-OH | 5 | [1] | 14 | 161 | 0.3 | 1.27 |
| 21 | PBT | 90 | SEPS-OH | 10 | [1] | 33 | 187 | 0.3 | 1.25 |
| 22 | PBT | 85 | SEPS-OH | 15 | [1] | 62 | 208 | 0.3 | 1.23 |
| 23 | PBT | 90 | SEBS-OH | 10 | [1] | 29 | 170 | 0.3 | 1.25 |
| 24 | PBT | 85 | SEBS-OH | 15 | [1] | 56 | 194 | 0.3 | 1.23 |
| 25 | PET | 85 | SEPS-OH | 15 | [3] | 25 | 101 | 0.3 | 1.37 |
| 26 | PET | 85 | SEBS-OH | 15 | [3] | 24 | 96 | 0.3 | 1.37 |
| Comp. Ex. | | | | | | | | | |
| 18 | PBT | 100 | — | 0 | — | 3 | 190 | — | 1.31 |
| 19 | PET | 100 | — | 0 | — | 2 | 110 | — | 1.49 |

Notes:
[1]: when transesterification was terminated.
[2]: when starting materials were fed.
[3]: when esterification was terminated.

transesterification and polycondensation. The PBT-polymer composition (a)③ obtained had an intrinsic viscosity of 1.01 dl/g.

PBT-polymer composition (a)④

The above procedure for preparing the PBT-polymer composition (a)① was followed except that SEPS—OH was used instead of EPS—OH(2) and that the ratio by weight of [theoretical yield of PBT]/[amount of SEPS—OH added] was set at 80/20, to conduct transesterification and polycondensation. The PBT-polymer composition (a)④ obtained had an intrinsic viscosity of 0.97 dl/g.

All the PBT-polymer compositions (a)① through ④ obtained above had a structure comprising a matrix principally comprising PBT and, dispersed therein, particles principally comprising a modified block copolymer and having an average particle diameter of 0.3 μm.

REFERENCE EXAMPLE 2

PBT (b)①

A reaction vessel was charged with 88 parts by weight of dimethyl terephthalate, 49 parts by weight of 1,4-butanediol and 0.035 part by weight of tetraisopropyl titanate. Transesterification was effected under atmospheric pressure by heating to elevate the temperature gradually from 170° C. to 230° C. and terminated when 28 parts by weight of methanol had been distilled off. The pressure inside the vessel was reduced to shift the system to polycondensation as follows. The reaction temperature was elevated from 230° C. to 250° C. over about 30 minutes, while the pressure was reduced from atmospheric pressure to 0.2 mmHg. Under this reaction temperature and pressure, polycondensation was effected for about 45 minutes. Then the polycondensation was terminated by introducing nitrogen into the vessel to restore the pressure to atmospheric pressure, to obtain a PBT (b)①. The intrinsic viscosity of the PBT thus obtained was determined at a temperature of 30° C. with a 1/1 by weight mixed solvent of phenol/tetrachloroethane, to give 0.80 dl/g.

PBT (b)②

PBT (b)② was prepared in the same manner as above except that the polycondensation time at 250° C. and 0.2 mmHg was changed from about 40 minutes to about 50 minutes. The PBT (b)② obtained had an intrinsic viscosity of 0.85 dl/g.

EXAMPLES 27 THROUGH 31

The PBT-polymer compositions (a)① through ④ and PBTs (b)① and ② (all in pellets) obtained in the above Reference Examples 1 and 2 were preliminarily mixed in a Henschel mixer in ratios as shown in Table 5 and the mixtures were then melt kneaded through a twin-screw extruder at a temperature of 250° C., to give pellets of PBT-polymer compositions. The pellets thus obtained were injection molded at a cylinder temperature and die temperature of 250° C. and 50° C. respectively, to give molded articles. The articles obtained were tested for various properties.

TABLE 5

| | Composition (parts by weight) | | | | | |
|---|---|---|---|---|---|---|
| | PBT-polymer composition (a) | | | | PBT (b) | |
| | ① | ② | ③ | ④ | ① | ② |
| Example 27 | 70 | | | | 30 | |
| Example 28 | | 70 | | | 30 | |
| Example 29 | | | 70 | | 30 | |
| Example 30 | | | | 60 | | 40 |
| Example 31 | | | | 80 | | 20 |

COMPARATIVE EXAMPLE 20

A reaction vessel was charged with 88 parts by weight of dimethyl terephthalate, 49 parts by weight of 1,4-butanediol and 0.035 part by weight of tetraisopropyl titanate. Transesterification was effected under atmospheric pressure by heating to elevate the temperature gradually from 170° C. to 230° C. and terminated when 28 parts by weight of methanol had been distilled off. Thereafter, the pressure inside the vessel was reduced to shift the system to polycondensation as follows. The reaction temperature was elevated from 230° C. to 250° C. over about 30 minutes, while the pressure was reduced from atmospheric pressure to 0.2 mmHg. Under this reaction temperature and pressure, polycondensation was effected for about 55 minutes. Then the polycondensation was terminated by introducing nitrogen into the vessel to restore the pressure to atmospheric pressure, to obtain a PBT. The intrinsic viscosity of the PBT obtained was determined at 30° C. with a 1/1 by weight mixed solvent of phenol/tetrachloroethane, to give 0.93 dl/g.

The polyester compositions obtained in the above Examples 27 through 31 and the polyester (single component) obtained in Comparative Examples 20 were tested for specific density, tensile elongation and Izod impact strength in the same manner as for the samples obtained in Examples 1 through 15 and Comparative Examples 1 through 17, except that injection molded specimens were used for the tests instead of pressed specimens. In addition, with each specimen the average particle diameter of dispersed particles principally comprising a modified block copolymer was measured in the same manner as in the above Examples 16 through 26. The melt viscosities were also measured according to the following method.

Measurement of Melt Viscosity

The measurement was made with a Capillograph made by Toyo Seiki Co. at a temperature of 250° C. and a shear rate of 1000 sec$^{-1}$. With a melt viscosity value as measured this way of not more than 2,500 poises, the specimen can be judged as having melt flowability suited for injection molding.

The results obtained are shown in Table 6.

TABLE 6

| | Polymer composition | | | Properties of molded article | | | | |
|---|---|---|---|---|---|---|---|---|
| | Ratio by weight[1] of PBT/modified block copolymer | Intrinsic viscosity[2] (dl/g) | Melt viscosity (poises) | Notched Izod (kgcm/cm) | Tensile elongation (%) | Average particle dia. (μm) | Specific gravity | |
| Ex. 27 | 92/8 | 0.93 | 2,300 | 14 | 120 | 0.3 | 1.26 | |
| Ex. 28 | 92/8 | 0.93 | 2,300 | 32 | 164 | 0.3 | 1.26 | |

TABLE 6-continued

| | Polymer composition | | | Properties of molded article | | | |
|---|---|---|---|---|---|---|---|
| | Ratio by weight[1]) of PBT/modified block copolymer | Intrinsic viscosity[2]) (dl/g) | Melt viscosity (poises) | Notched Izod (kgcm/cm) | Tensile elongation (%) | Average particle dia. (μm) | Specific gravity |
| Ex. 29 | 92/8 | 0.93 | 2,300 | 38 | 185 | 0.3 | 1.26 |
| Ex. 30 | 89/11 | 0.88 | 2,000 | 65 | 206 | 0.3 | 1.25 |
| Ex. 31 | 96/14 | 0.91 | 2,300 | 79 | 231 | 0.3 | 1.23 |
| Comp. Ex. 20 | — | 0.93 | 1,500 | 3 | 190 | — | 1.31 |

Notes:
[1])Total of the amount of PBT in the PBT-polymer composition used in melt kneading and the amount of PBT used.
[2])Determined with a 1/1 by weight mixed solvent of phenol/tetrachloroethane.

It is understood from the above Tables 4 and 6 that the composition of the present invention gives molded articles having larger elongation compared with corresponding polyesters alone.

It is further understood from the above Tables 4 and 6 that the composition of the present invention gives molded articles having larger Izod impact strength compared with corresponding polyesters alone.

It is still further understood from the above Tables 4 and 6 that the composition of the present invention gives molded articles having smaller specific gravity, i.e. having achieved lighter weight, compared with corresponding polyesters alone, Obviously, numerous modifications and variations of the present invention are possible in light of the above teachings. It is therefore to be understood that within the scope of the appended claims, the invention may be practiced otherwise than as specifically described herein.

What is claimed is:

1. A polyester composition comprising:
   (a) at least one polyester; and
   (b) a first block copolymer (b−1) having chain-terminating hydroxyl groups, said first block copolymer comprising:
   at least one block A selected from the group consisting of a polymer block consisting essentially of an aromatic vinyl compound and a hydrogenated polybutadiene block obtained by hydrogenating a polybutadiene block having not more than 20% of a 1,2-bond and
   at least one block B selected from the group consisting of a hydrogenated poplyisoprene block and a hydrogenated isoprene-butadiene random copolymer block; and/or
   a second block copolymer (b−2) having chain-terminating hydroxyl groups, said second block copolymer comprising:
   at least one polymer block C consisting essentially of an aromatic vinyl compound and
   at least one polyisobutylene block D;
   said composition obtained by a process which comprises, upon preparation of a polyester (a) by esterification or transesterification and the succeeding polycondensation, adding a block copolymer (b) in a ratio by weight of said polyester/said block copolymer of 98/2 to 40/60 at a time before completion of polycondensation of said polyester.

2. The polyester composition according to claim 1, comprising (1) a polyester having been obtained by polycondensation in the presence of said block copolymer (b) and (2) another polyester, the ratio by weight between the polyesters (a) and the block copolymer (b) being 98/2 to 40/60.

3. The polyester composition according to claim 1, said composition comprising a matrix resin principally comprising said polyester (a) and dispersed therein particles principally comprising said at least one block copolymer (b), said particles having an average diameter of not more than 1 micron.

4. The polyester composition according to claim 1, wherein the polyester is polyethylene terephthalate.

5. The polyester composition according to claim 1, wherein the polyester is polybutylene terephthalate.

6. The polyester composition according to claim 1, wherein the polyester is polyethylene naphthalate.

7. The polyester composition according to claim 1, wherein the block copolymer (b−1) is selected from at least one of the formulas $(W-X)_k-OH$, $(X-W)-OH$, $W-(X-W)m-OH$, or $X-(W-X)n-OH$, wherein W is polymer block A, X is polymer block B, and k, l, m, and n are an integer of at least one and not more than 5.

8. The polyester composition according to claim 7, wherein the block copolymer (b−1) has at least 80% of carbon-carbon double bonds hydrogenated.

9. The polyester composition according to claim 1, wherein component (b) is chain-terminated by a styrene monomer unit followed by a hydroxyl group.

10. The polyester composition according to claim 1, wherein component (b) is obtained from block copolymers selected from the group consisting of polystyrene/polyisoprene di-block copolymer, polystyrene/polyisoprene/polystyrene triblock copolymer, polystyrene/polyisobutylene/polystyrene triblock copolymer, and mixtures thereof.

11. The polyester composition according to claim 9, wherein component (a) is polybutylene terephthalate.

* * * * *